(12) United States Patent
Lange et al.

(10) Patent No.: US 10,259,274 B2
(45) Date of Patent: Apr. 16, 2019

(54) PRESSURE SENSITIVE FOIL, A TIRE PRESSURE SENSOR MODULE, A TIRE, A METHOD AND A COMPUTER PROGRAM FOR OBTAINING INFORMATION RELATED TO DEFORMATIONS OF A TIRE

(71) Applicant: Infineon Technologies AG, Neubiberg (DE)

(72) Inventors: Thomas Lange, Munich (DE); Andre Peine, Munich (DE)

(73) Assignee: Infineon Technologies AG, Neubiberg (DE)

( * ) Notice: Subject to any disclaimer, the term of this patent is extended or adjusted under 35 U.S.C. 154(b) by 106 days.

(21) Appl. No.: 14/796,541

(22) Filed: Jul. 10, 2015

(65) Prior Publication Data

US 2017/0008355 A1    Jan. 12, 2017

(30) Foreign Application Priority Data

Jul. 18, 2014    (DE) .......................... 10 2014 110 183

(51) Int. Cl.
*B60C 23/00*    (2006.01)
*B60C 23/04*    (2006.01)
*B60C 23/06*    (2006.01)

(52) U.S. Cl.
CPC ........ *B60C 23/0433* (2013.01); *B60C 23/064* (2013.01)

(58) Field of Classification Search
CPC . B60C 23/0433; B60C 23/06; B60C 23/0408; B60C 23/061; G01L 17/00; G01M 17/022; G01N 3/40
(Continued)

(56) References Cited

U.S. PATENT DOCUMENTS 4,862,486 A * 8/1989 Wing .................. B60C 23/0493
200/61.23
5,573,611 A * 11/1996 Koch .................. B60C 23/0493
152/152.1
(Continued)

FOREIGN PATENT DOCUMENTS

DE    19825761    12/1999
DE    10240446    3/2004
(Continued)

OTHER PUBLICATIONS

Office Action issued for DE 10 2014 110 183.9, German Patent Office, dated Dec. 3, 2014.

*Primary Examiner* — Lisa M Caputo
*Assistant Examiner* — Nigel Plumb
(74) *Attorney, Agent, or Firm* — Schiff Hardin LLP (57) ABSTRACT

Embodiments provide a pressure sensitive foil, a tire pressure sensor module, a tire, a method and a computer program for determining information related to deformations of a tire. A pressure sensitive foil configured to determine information related to deformations of a tire. The pressure sensitive foil comprises an interface configured to provide the information related to the deformations of the tire to a control device. A tire pressure sensor module is configured to provide information related to deformations of a tire to a control device. The tire pressure sensor module comprises an interface configured to determine the information related to the deformations of the tire from a pressure sensitive foil.

23 Claims, 4 Drawing Sheets (58) Field of Classification Search
USPC ....... 73/146.5, 146.4, 146.3, 146.2, 146, 78, 73/862.381
See application file for complete search history.

(56) References Cited

U.S. PATENT DOCUMENTS

| | | | | |
|---|---|---|---|---|
| 7,406,863 | B2 * | 8/2008 | Ogawa | B60T 8/1725 73/146 |
| 7,472,587 | B1 * | 1/2009 | Loehndorf | G01M 17/02 73/146 |
| 7,523,656 | B1 * | 4/2009 | Blixhavn | B60C 23/0411 73/146.5 |
| 8,700,286 | B2 * | 4/2014 | Steiner | B60C 23/0416 340/442 |
| 8,742,912 | B2 * | 6/2014 | Blanchard | B60C 23/041 340/442 |
| 2003/0149515 | A1 * | 8/2003 | Hessmert | B60T 8/17551 701/31.4 |
| 2012/0291537 | A1 * | 11/2012 | Honda | G01M 17/02 73/146 |
| 2013/0312509 | A1 * | 11/2013 | Solomon | B60C 23/0486 73/146.4 |
| 2014/0107946 | A1 * | 4/2014 | Kandler | B60C 11/246 702/34 |
| 2017/0197481 | A1 * | 7/2017 | Peine | B60C 23/0494 |

FOREIGN PATENT DOCUMENTS

| | | | | |
|---|---|---|---|---|
| DE | 69907375 T2 | | 4/2004 | |
| DE | 102014110184 | * | 7/2014 | ......... B60C 23/0486 |
| EP | 1547827 | | 6/2005 | |
| JP | 2008149967 | | 7/2008 | |

* cited by examiner

PRESSURE SENSITIVE FOIL, A TIRE PRESSURE SENSOR MODULE, A TIRE, A METHOD AND A COMPUTER PROGRAM FOR OBTAINING INFORMATION RELATED TO DEFORMATIONS OF A TIRE

BACKGROUND OF THE INVENTION

Embodiments relate to a pressure sensitive foil, a tire pressure sensor module, a tire, a method and a computer program for obtaining information related to deformations of a tire.

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component or control device in the vehicle. Such a configuration may enable the system to report or signal pressure losses of the tires to the driver. In general, a tire of a vehicle can be assumed as an important component with respect to driving dynamics, safety and comfort. Aside from tire pressure monitoring other parameters, such as a dynamic behavior of a contact area of the tire may also be considered significant. Laboratory tests showed that changes in shape, form, size, position (e.g. a shift or angular shift relative to a defined position of the tire), and pressure distribution of the contact area may provide information based on which, for example, a grip of the tire in a cornering situation or starting aquaplaning may be detected. Information related to driving dynamics may be used to improve comfort and safety of a vehicle.

SUMMARY

Embodiments provide a pressure sensitive foil, a tire pressure sensor module, a tire, a method and a computer program for obtaining information related to deformations of a tire. Embodiments may enable to obtain, determine or measure information related to a dynamic behavior of a contact area of a tire using a pressure sensitive foil.

Embodiments provide a pressure sensitive foil configured to sense information related to deformations of a tire. The pressure sensitive foil comprises an interface configured to provide a signal indicating the information related to the deformations of the tire to a control device. The pressure sensitive foil may serve as a sensor configured to provide a signal based on which information related to tire deformations can be provided to the control device. Embodiments may make such information available during regular operation of a vehicle, as the pressure sensitive foil may be used in or at the tire. Embodiments may therefore allow the control device evaluating said information and take further measures, e.g. in terms of warning indicators to a driver or suspension control in order to improve comfort and/or safety of the vehicle.

In embodiments the interface of the pressure sensitive foil may be configured to provide the signal indicating the information related to the deformations of the tire to the control device via a tire pressure sensor module. Embodiments may enable a TPMS to be used together with the pressure sensitive foil and to use the TPMS to forward the information related to the tire deformations to a control unit or device of a vehicle. Embodiments may use a synergy effect of the pressure sensitive foil and the TPMS both being implemented at or in the tire. In some embodiments the interface of the pressure sensitive foil may be configured to establish a wired connection to the tire pressure sensor module. Embodiments may hence enable a simple implementation of the interface. In other embodiments such interface may be a wireless interface, such as a near field communication interface, and such embodiments may ease a replacement of the tire or the TPMS. Further embodiments may provide the interface being further configured to power supply the pressure sensitive foil. In other words the interface may also function as a power supply or power connector for the pressure sensitive foil. Embodiments may hence use a single interface for power supply and communication, which may allow for easier or more efficient coupling to a TPMS or any other module.

In some embodiments the pressure sensitive foil may be further coupled to a controller, which is configured to provide a signal to the pressure sensitive foil based on which the information related to the deformations of the tire is sensed. The controller may, for example, provide measurement signals and monitor signal variations, e.g. evoked by variances in impedance, capacitance or inductance of the pressure sensitive foil. Embodiments may allow using controlled measurements by means of the controller. The controller may be configured to carry out tire deformation measurements using the pressure sensitive foil as deformation sensor. Embodiments may therefore enable to carry out different measurements using the controller, which may, for example, be programmable. Embodiments may enable measurements of a dynamic behavior of a contact area of a tire using the pressure sensitive foil, which may be power supplied by a tire pressure module or TPMS and which may use the tire pressure module or TPMS to communicate information related to the measurements to a vehicle or a control device thereof.

Embodiments further provide a tire pressure sensor module configured to provide information related to deformations of a tire to a control device. The tire pressure sensor module comprises an interface configured to obtain a signal indicating the information related to the deformations of the tire from a pressure sensitive foil. Embodiments may enable a tire pressure sensor module or TPMS to further provide measurement results to a control device or control unit of a vehicle. As described above, the interface may be configured to establish a wired connection to the pressure sensitive foil. In other embodiments a wireless coupling is conceivable as indicated above. In some embodiments the tire pressure sensor module may comprise a transmitter configured to wirelessly transmit, or transmit in a wireless manner, the information related to the deformation of the tire to the control device. Embodiments may enable a wireless transmission of the information related to the tire pressure and information related to tire deformations from the TPMS inside the tire to a control unit of the vehicle.

In further embodiments the interface may further be configured to power supply to the pressure sensitive foil, in line with the above description. Embodiments may enable a passive pressure sensitive foil, which is power supplied by the tire pressure sensor module. The tire pressure sensor module may comprise an energy harvester configured to generate the power to supply the pressure sensitive foil. Embodiments may use an energy harvester comprised in the TPMS to supply power for the pressure sensitive foil using the interface and the TPMS. In further embodiments the tire pressure sensor module may further comprise a controller. The controller may be configured to provide signals to the pressure sensitive foil using the interface based on which the information related to the deformations of the tire are sensed. In line with the above described controller the pressure sensitive foil may be attached to in some embodiments, said controller may be comprised in the TPMS. In such embodiments the TPMS may further control the pressure sensitive foil and the deformation measurements carried out using the foil. Hence, in some embodiments the controller of the tire pressure sensor module may be configured to carry out tire deformation measurements using the pressure sensitive foil as deformation sensor.

Embodiments further provide a tire comprising a pressure sensitive foil according to the above description. Embodiments may provide a tire with an integrated or a comprised pressure sensor, which may allow deformation measurements on a contact area of the tire. In further embodiments the tire may further comprise a tire pressure sensor module according to the above description, which is coupled to the pressure sensitive foil. Some embodiments may hence enable or provide a tire and tire assembly with an integrated system for tire pressure monitoring and driving dynamic measurements of the contact area. The pressure sensitive foil may extent at least partly along an inside of the tire on the backside of a contact surface of the tire, or the pressure sensitive foil may extent along an inside of a tire and along a complete circumferential backside of a contact surface of the tire.

Embodiments may hence provide a tire for a vehicle comprising a pressure sensitive foil configured to sense information related to deformations of the tire. The pressure sensitive foil further comprises a first interface configured to provide a signal indicating the information related to the deformations of the tire to a tire pressure sensor module, which is also comprised in the tire. The tire pressure sensor module may comprise a second interface, which is coupled with the first interface, to obtain the signal indicating the information related to the deformations of the tire from the pressure sensitive foil. The tire pressure sensor module further comprises a transmitter configured to wirelessly transmit the information related to the deformation of the tire to a control device.

Embodiments further provide a method for obtaining information related to deformations of a tire. The method comprises sensing a signal indicating the information related to the deformations of the tire. The method further comprises wirelessly transmitting the information related to the deformation of the tire from the tire to a control device.

Embodiments further provide one or more computer programs having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Embodiments further provide a system comprising embodiments of the above described pressure sensitive foil and the tire pressure sensor module. Embodiments may also provide a vehicle or tire comprising such a system.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION OF THE INVENTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
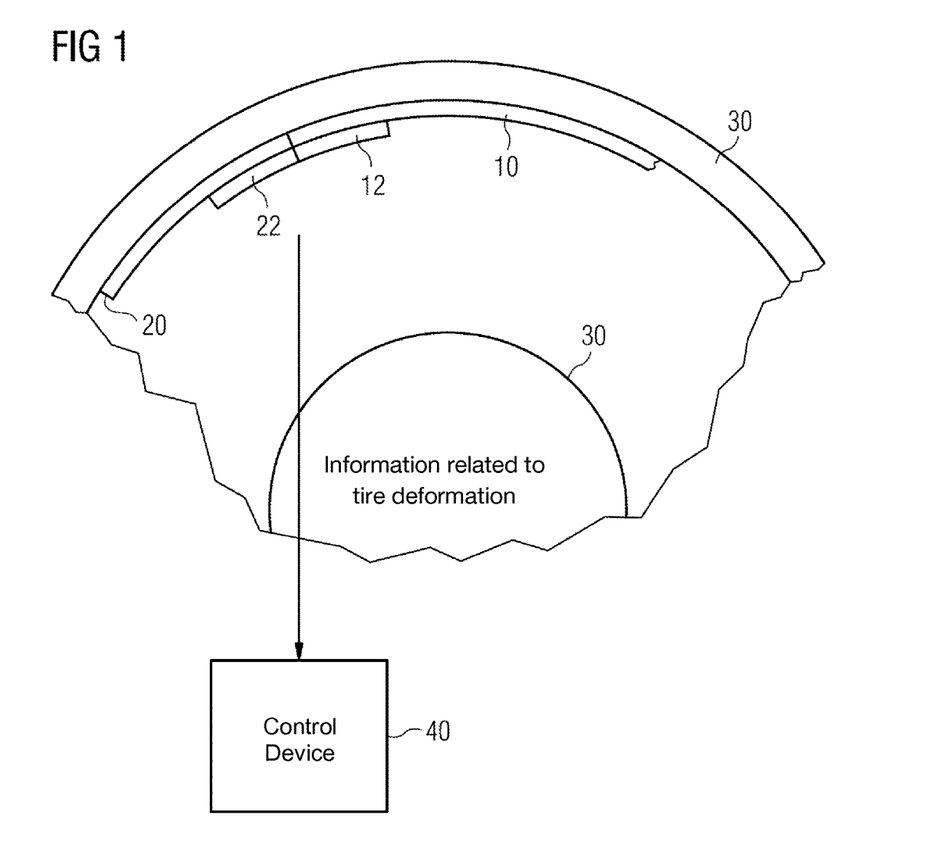
FIG. 1 shows an embodiment of a pressure sensitive foil, an embodiment of a tire pressure sensor module and an embodiment of a tire.

FIG. 1 shows an embodiment of a pressure sensitive foil 10, an embodiment of a tire pressure sensor module 20, which may also be referred to as tire pressure measurement device, and an embodiment of a tire 30. The pressure sensitive foil 10 is configured to sense information related to deformations of a tire 30. The pressure sensitive foil 10 comprises an interface 12 configured to provide the information related to the deformations of the tire to a control device 40. Herein the term "pressure sensitive foil" is to be understood as a film, layer, slide, membrane or sheet having a pressure sensitive or touch-sensitive property, such as a pressure sensitive capacitance, inductance, resistance, impedance, etc. The pressure sensitive foil 10 may hence be a flexible structure, e.g. comprising plastic, polymer and/or synthetic material. In some embodiments the pressure sensitive foil may correspond to a mass-produced foil, such as used for input devices or input units, for example for touch-screens.

In some embodiments the pressure sensitive foil 10 may correspond to a resistive foil and it may comprise several layers, the most important of which may be two thin, transparent electrically-resistive layers separated by a thin space. These layers may face each other with a thin gap between. One layer may have a coating on the underside surface of the foil. Just beneath it is a similar resistive layer on top of its substrate. One layer may have conductive connections along its sides, the other along top and bottom. A voltage may be applied to one layer, and sensed by the other. When a deformation of the foil 10 occurs, the two layers touch to become connected at that point. The foil 10 may then behave as a pair of voltage dividers, one axis at a time. By rapidly switching between each layer, the position of a pressure in the foil and hence information related to its deformation can be determined. Further embodiments may use a similar concept exploiting a pressure sensitive capacitance between two layers of the foil 10.

Such a resistive touch foil may be used in some embodiments for its high resistance to liquids and contaminants as well as for its low cost. Additionally, as only sufficient pressure is necessary for the touch to be sensed, they may be used with different sizes and types of tires, in particular with tread sections having different thicknesses. In some embodiments a capacitive touchscreen panel or foil may comprise an insulator such as Plexiglass or a flexible substrate coated with a conductor such as indium tin oxide. As another electrical conductor (on a separate layer) touches the surface of the screen or foil a distortion of the foil's electrostatic field may result, measurable as a change in capacitance. Different technologies may be used to determine the location of the touch. The location may then be sent to a controller or the tire pressure sensor module for processing. In some embodiments the pressure sensitive foil may be made up of a matrix of rows and columns of conductive material, layered on sheets of a polymer or Plexiglas or flexible substrate. This can be done either by etching a single conductive layer to form a grid pattern of electrodes, or by etching two separate, perpendicular layers of conductive material with parallel lines or tracks to form a grid.

Voltage applied to this grid may create a measurable uniform electrostatic field. When a conductive object, such as another conductive layer on the foil, comes into contact with a projective capacitance touch panel or foil, it distorts the local electrostatic field at that point. This is measurable as a change in capacitance. If a conductive layer bridges the gap between two of the "tracks", the charge field may be further interrupted and detected by a controller or tire pressure sensor module. The capacitance can be changed and measured at every individual point on the grid (intersection). Some embodiments of the foil may make use of the fact that most conductive objects are able to hold a charge if they are very close together. In mutual capacitive sensors or foils, a capacitor may be inherently formed by the row trace and column trace at each intersection of the grid. A voltage may be applied to the rows or columns. Bringing a conductive layer close to the surface of the sensor changes the local electrostatic field which reduces the mutual capacitance. The capacitance change at every individual point on the grid can be measured to accurately determine the touch location by measuring the voltage in the other axis. Mutual capacitance may allow multi-touch operation where multiple touches or a form or size of the touched area may be accurately tracked.

As further illustrated in FIG. 1 the pressure sensitive foil 10 can be attached to or laminated in an embodiment of the tire 30, where FIG. 1 shows the pressure sensitive foil 10 located on the inside of the tire 30 at the backside of a contact area of the tire 30. In different embodiments a coupling between the tire 30 and the foil 10 may be implemented as any mechanical coupling, such as, adhesive coupling, laminating such that the foil 10 is located between several material layers or inside a material layer the tire 30 is composed of.

The interface 12 of the pressure sensitive foil 10 is configured to provide a signal indicating the information related to the deformation of the tire. As described above such interface may correspond to a contact area for the foil 10 and may allow applying a signal, such as a voltage to the foil 10, different layers thereof, respectively. In other words the interface 12 may allow measuring a physical quantity of the foil 10 which carries information indicative of a deformation of the foil 10 and therewith of the tire 30, its contact area respectively.

FIG. 1 further illustrates an embodiment of a tire pressure sensor module 20 configured to provide information related to deformations of the tire 30 to the control device 40. The tire pressure sensor module 20, e.g. a TPMS 20, further comprises an interface 22 configured to determine the information related to the deformations of the tire 30 from the pressure sensitive foil 10. As shown in FIG. 1 the interface 12 of the pressure sensitive foil 10 and the interface 22 of the tire pressure sensor module 20 are coupled, such that the information related to the deformation of the tire 30 can be provided from the pressure sensitive foil 10 to the tire pressure sensor module 20, and from the tire pressure sensor module 20 to the control device 40. In other words the interface 12 of the pressure sensitive foil 10 is configured to provide the information related to the deformations of the tire 30 to the control device 40 via a tire pressure sensor module 20. The interface 20 of the tire pressure sensor module 20 is configured to establish a wired connection to the pressure sensitive foil 10.

In embodiments the pressure sensor module 20 may be configured to provide information related to a pressure of a tire 30 of a vehicle. In the following a vehicle can be any vehicle using tires, as, for example, a car, a van, a truck, a bus, a plane, a bike, a motorbike, etc. Although, some embodiments may be exemplified using a car, any other vehicle can be utilized in embodiments. The tire pressure sensor module 20 may comprise a pressure sensor, which is configured to obtain the signal indicating the information related to the pressure of the tire 30. The pressure sensor, which may be implemented as pressure determiner, may correspond to one or more pressure sensors, one or more pressure sensing elements, one or more pressure detectors, one or more pressure units, etc. The pressure sensor may be configured to determine any signal or information, which may be analog or digital, related to the pressure of its surrounding, for example of the tire 30, when the pressure sensor is mounted or coupled thereto.

In the embodiment shown in FIG. 1 the interfaces 12 and 22 are configured to establish a wired connection between the pressure sensitive foil 10 and the tire pressure sensor module 20. As mentioned above, in some embodiments there may be a wireless connection, for example, using near field communication means. In the embodiment shown in FIG. 1 the tire pressure sensor module 20 comprises a transmitter, which is configured to wirelessly transmit the information related to the deformation of the tire 30 to the control device 40. The transmitter is configured to wirelessly transmit information related to the pressure of the tire 30 to the control device 40, for example, a control unit of a vehicle or service station, for example an Electronic Control Unit (ECU). The transmitter may be implemented as or comprise one or more modules, devices, or units comprising transmitter or transceiver components such as typical transmitter and/or receiver components. Such components may include one or more components of the group of one or more transmit and/or receive antennas, one or more transmit and/or receive loops or coils, one or more low noise amplifiers, one or more power amplifiers, one or more filters, one or more duplexers or diplexers, one or more analog-digital and/or digital-analog converters, etc.

Furthermore, in the embodiment shown in FIG. 1 the interface 12 is further configured to power supply the pressure sensitive foil 10. Correspondingly, the interface 22 is configured to power supply to the pressure sensitive foil 10. In other words, signals or energy to carry out the deformation measurements may be provided by the TPMS 20 through the interfaces 12 and 22. For example, the tire pressure sensor module 20 may further comprise an energy harvester configured to generate the power to supply the pressure sensitive foil 10. The TPMS module 20 may be equipped with an energy harvester or a nano generator and may be a battery-free TPMS sensor 20, which converts mechanical energy of the pulse when the TPMS sensor 20 hits the ground into an electrical signal from which energy and other information may be determined, for example, information on a rotational frequency of the wheel can be determined. The tire pressure measurement module 20 may be mounted inside the tire 30 and may use the energy harvester as power supply. For example, the energy harvester may be mounted inside the tire on the backside of a contact area of the tire 30. The surface of the tire 30 experiences deformations at the contact area with the underground, e.g. it is compressed when entering the contact area and decompressed when exiting the contact area. These deformations are also experienced on the inside of the tire 30. The energy harvester may convert this mechanical energy into electrical energy, which is then used to power supply the tire pressure module 20. For example, the energy harvester may comprise a piezoelectric element to convert mechanical energy into electrical energy.

In a further embodiment, the pressure sensitive foil 10 is further coupled to a controller or microcontroller, which may be implemented as or comprise any processor, multi-purpose processor, Digital Signal Processor (DSP), programmable hardware, etc. and accordingly adapted software. The controller is configured to provide a signal to the pressure sensitive foil 10 based on which the information related to the deformations of the tire 30 is determined. In embodiments the controller may be internal or external to the foil 10, the tire pressure sensor module 20, respectively. That is to say that the controller may be comprised in the pressure sensitive foil 10, in the tire pressure sensor module 20, or it may be external, multiple controllers may be present, respectively. If the controller is comprised in the tire pressure sensor module 20, the controller can be configured to provide signals to the pressure sensitive foil 10 using the interfaces 12 and 22 based on which the information related to the deformations of the tire 30 is determined. In some embodiments the controller may be configured to carry out tire deformation measurements using the pressure sensitive foil 10 as deformation sensor as described above.

FIG. 1 illustrates an embodiment of the tire 30, which comprises the tire pressure sensor module 20 and which is coupled to the pressure sensitive foil 10. The shape or form of the contact area of the tire 10 and its dynamic changes may be considered as of critical importance for safety, comfort and driving dynamics of a vehicle. Embodiments may enable measurements of the contact area outside of laboratories and may provide a concept for integration of such measurement functionality in standard vehicles. Conventionally, the behavior of a vehicle in an aquaplaning situation may be examined by driving the vehicle across large glass plates covered with water such that the contact area of the tires can be monitored from underneath, e.g. by means of one or more high speed cameras. Other experiments may use acceleration sensors in the cap of a tire. When a tire section enters the contact area compression and decompression may be measured using the acceleration sensors, where the information related to the acceleration may also provide information related to the dynamic behavior of the contact area of the tire.

Embodiments may enable an integration of measurements related to driving dynamics into tires of mass-produced vehicles. In some embodiments the information related to the deformations of the tire comprises information related to a shape or form of a contact area of the tire. Embodiments may use synergy effects with TPMS, which may be integrated in mass-produced vehicles anyway because of the respective regulations, for example, regulations in the US and EU markets. Embodiments may therefore provide an extension or extension module for TPMS in terms of the respective interfaces and the pressure sensitive foil.

Figure 2:
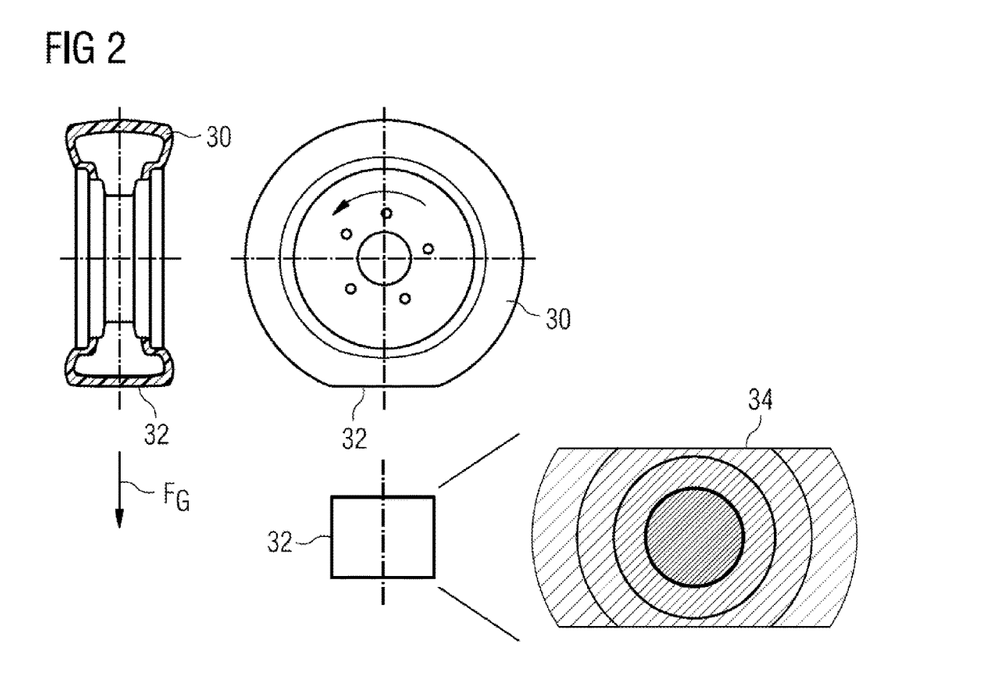
FIG. 2 illustrates a shape and pressure distribution of a contact area of a tire in a standstill scenario in an embodiment.

FIG. 2 illustrates a shape and pressure distribution of a contact area of a tire 30 in an embodiment, where a standstill of a vehicle is assumed. FIG. 2 shows a longitudinal section of the tire 30 (view from the front), where the contact area 32 with the ground is shown at the bottom end. The gravitational force $F_G$ evoked by the weight of the vehicle flattens the contact area 32 as compared to the shape of the non-contact area sections of the tire 30, for example the section shown at the top. The side view on the right of FIG. 2 shows the tire 30 and the contact area 32, where the same flattening characteristic can be observed. The contact area 32 is illustrated in an isolated manner underneath the side view of the tire 30 and it can be seen that the contact area 32 has a rectangular shape. On the right hand side of the isolated contact area 32, FIG. 2 depicts a pressure distribution 34 of the contact area, which extends symmetrically and concentrically around a maximum pressure in the center of the tire, the rim, respectively. The pressure distribution 34 further depends on the tire pressure. In the following, some correlation between a dynamic behavior of the contact area 32 and the dynamic driving characteristic of the vehicle will be considered. FIG. 2 shows the contact area for a halted vehicle (standstill).

Figure 3:
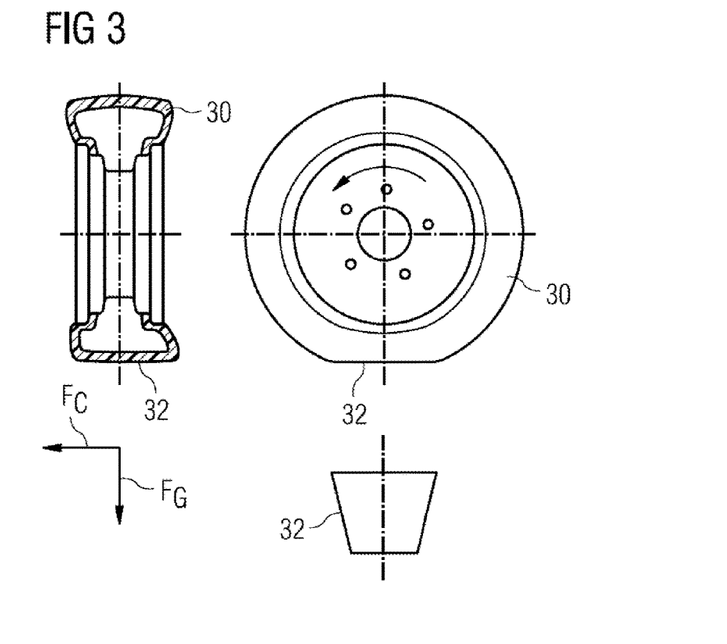
FIG. 3 illustrates a shape and pressure distribution of a contact area of a tire in a cornering scenario in an embodiment.

FIG. 3 illustrates a shape and pressure distribution of a contact area 32 of the tire 30 in a cornering scenario in an embodiment. When the vehicle drives along a curve/corner, the tires 30 have to compensate for the centrifugal force. As indicated in FIG. 3 the centrifugal force $F_C$ and the gravitational force $F_G$ influence the contact area 32. FIG. 3 shows a front view of a longitudinal section of the tire 30 on the left, a side view of the tire 30 on the right, and the shape of the contact area 32 at the bottom. The grip of the tire 30 needs to compensate gravitational and centrifugal forces. These forces lead to a deformation of the tire 30 and the contact area 32, which can be sensed in embodiments using the pressure sensitive foil 10. The outside of the tire 30 (the section at the outer radius of the curve or bend) experiences higher forces, which leads to a larger contact area than on the inside of the tire 30. Overall this effect is displayed in FIG. 3 by the trapezoidal form of the contact area 32.

Figure 4:
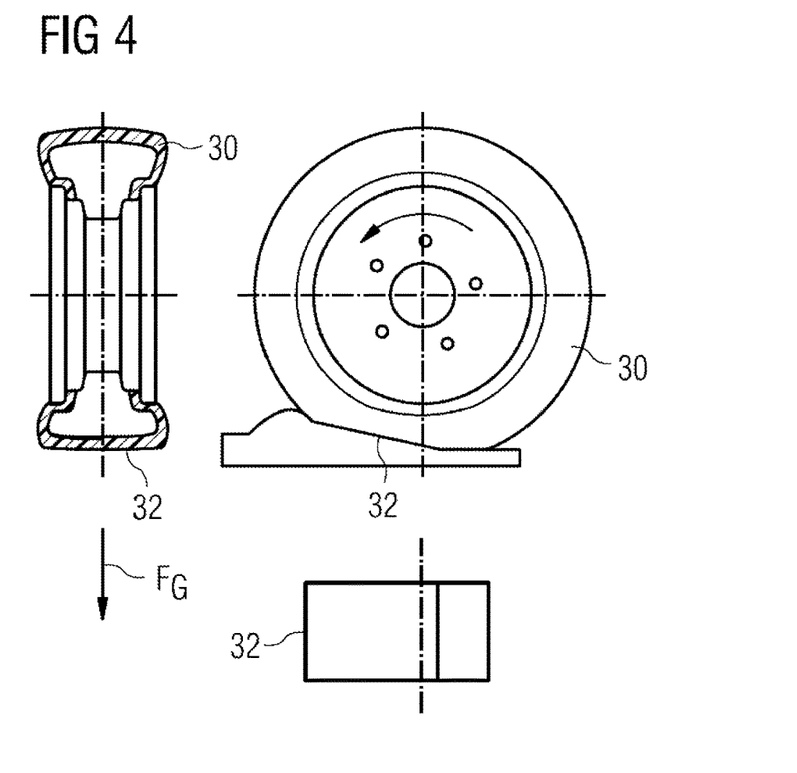
FIG. 4 illustrates a shape and pressure distribution of a contact area of a tire in an aquaplaning situation in an embodiment.

FIG. 4 illustrates a shape and pressure distribution of a contact area 32 of a tire 30 in an aquaplaning situation in an embodiment. FIG. 4 displays the same views of tire 30 with contact area 32 as FIGS. 2 and 3. The phenomenon of aquaplaning occurs, when water underneath the tire 30 cannot be suppressed any more, e.g. by the tread grooves of the tire. A wedge of water starts to build up in front of the tire, which leads to floating of the vehicle and a loss of contact with the road surface underneath. As FIG. 4 illustrates the contact area 32 then becomes asymmetrical to the center of the tire 30, the rim, respectively.

Figure 5:
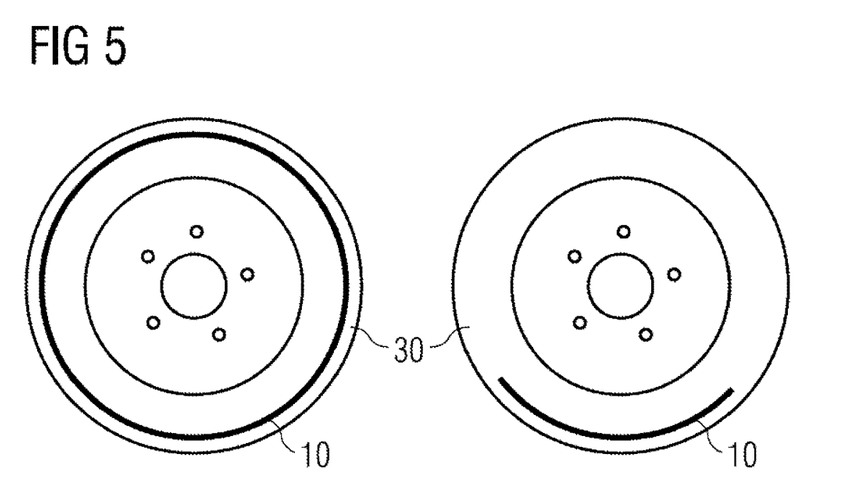
FIG. 5 illustrates two embodiments of tires comprising a pressure sensitive foil.

FIG. 5 illustrates two embodiments of tires 30 comprising the pressure sensitive foil 10. In the embodiment depicted on the right hand side of FIG. 5 the pressure sensitive foil 10 extents at least partly along an inside of the tire on the backside of a contact surface of the tire 30. As can be seen in FIG. 5 the pressure sensitive foil 10 extends partly along an inner circumference of the tire 30 on the backside on the contact surface (the outer circumferential area of the tire 30). On the left hand side FIG. 5 depicts another embodiment of a tire 30 with the pressure sensitive foil 10. In this embodiment the pressure sensitive foil 10 extents along the inside of the tire 30 and along a complete circumferential backside of the contact surface of the tire 30.

As described above, the variations or de ations of the contact area 32 of the tire 30 influence the pressure sensitive foil 10 through which information on the variations, deformations, or the pressure distribution in the contact area 32 can be made available and therewith information related to the driving dynamics or the dynamic situation of the vehicle. A combination with the above-described TPMS 20 may allow to power supply the pressure sensitive foil 10 to enable said measurements and to also enable information transfer to the control unit 40. With the pressure or touch sensitive foil 10 in or at the contact surface of the tire 30 dynamics of the pressure distribution in the contact surface may be determined. In some embodiments the pressure sensitive foil 10 may be configured to sense a plurality of areas or points on the contact surface of the tire 30 during operation of the vehicle. As shown in FIG. 5 on the left, the foil 10 may extent along the complete inner surface (backside surface of the contact are) of the tire 30 and may enable permanent measurements. If the foil 10 extents only partially along the inner surface (backside surface of the contact area) of the tire 30 the contact area deformations or pressure distribution may be measured or sensed once per rotational cycle of the tire 30.

Summarizing, the Figs. also depict embodiments of a tire 30 for a vehicle, which comprises a pressure sensitive foil 10 configured to obtain information related to deformations of a tire 30 and which comprises a first interface 12 configured to provide the signal indicating information related to the deformations of the tire 30 to a tire pressure sensor module 20. The tire pressure sensor module 20 comprises a second interface 22, which is coupled with the first interface 12, to obtain the signal indicating the information related to the deformations of the tire 10 from the pressure sensitive foil 10. The tire pressure sensor module 20 further comprises a transmitter configured to wirelessly transmit the information related to the deformation of the tire 30 to a control device 40.

Figure 6:
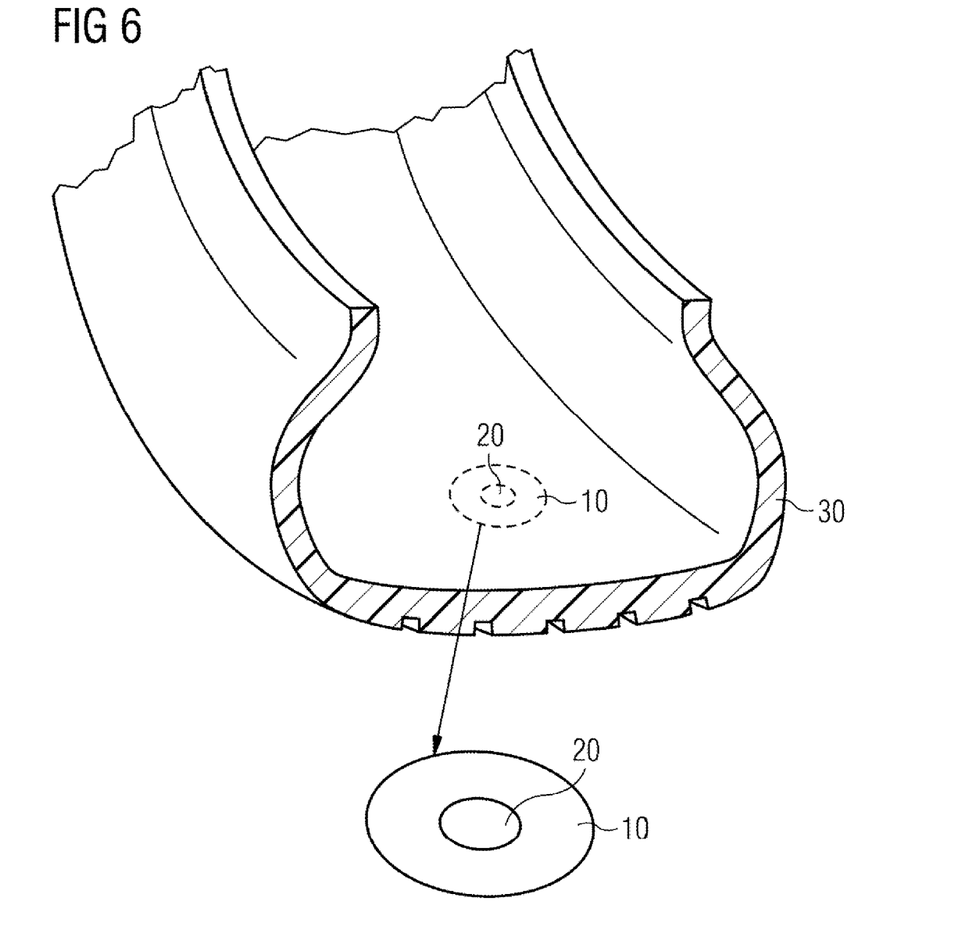
FIG. 6 shows an embodiment of a tire pressure sensor module with a pressure sensitive foil.

FIG. 6 shows an embodiment of a tire pressure sensor module 20 with a pressure sensitive foil 10. FIG. 6 shows the TPMS 20 and its mounting or position in or at the tire 30 at the top. At the bottom FIG. 6 shows a magnification of the TPMS 20 in the center and the pressure sensitive foil 10 surrounding the TPMS 20 in a concentric setup. The interfaces between the TPMS 20 and the foil 10 are implemented along the circular inner edge of the foil 10, the circular outer edge of the TPMS 20, respectively. FIG. 6 shows an embodiment in which the in-tire TPMS 20 is combined with the pressure sensitive foil 10. The system, the tire pressure sensor module 20 and/or the pressure sensitive foil 10, respectively, may be mounted into a pocket at the inner surface of the tire 30 (backside of the contact surface). In other embodiments the system may be laminated into the tire material, for example, on the backside of the contact surface or in the material between the contact surface and its backside. An electrical coupling between the two components may therefore be efficiently implemented. An energy harvester comprised in the TPMS 20 may provide power for both components. In particular at higher velocities the energy harvester may provide sufficient energy, in some embodiments even more energy than actually required for the two components 10 and 20. This may correlate with the increased need of information related to the driving dynamics at higher velocities of the vehicle. The TPMS 20 may comprise a microcontroller and a Radio Frequency (RF) interface to a control device 40 of the vehicle in line with the above description. The TPMS 20 may hence pre-process or process the information or data obtained from the pressure sensitive foil 10 and provide such information or data to the vehicle, its control device 40, respectively. It is to be noted that the TPMS 20 may comprise multiple pressure sensors, which may be coupled to each other. For example, the TPMS 20 may correspond or further comprise a valve mounted pressure sensor.

It is to be noted that different geometries of the pressure sensitive foil 10 are conceivable in embodiments. FIG. 5 illustrates a circumferential extension of the pressure sensitive foil 10, which may be partially or completely along the backside of the contact area of the tire. FIG. 6 shows a concentric geometry of the TPMS 20 and the pressure sensitive foil 10. In other embodiments the pressure sensitive foil 10 may comprise one or more stripes or bands, which may be oriented at least partly along the circumference of the backside of the contact area and which may completely or partly cover the width of the backside of the contact area of the tire. In other words, the pressure sensitive foil 10 may comprise band or stripes which may form a mesh with one or more openings in its structure, which can be laminated into the tire material between the contact surface and the backside of the contact surface, for example using one or more pockets.

Figure 7:
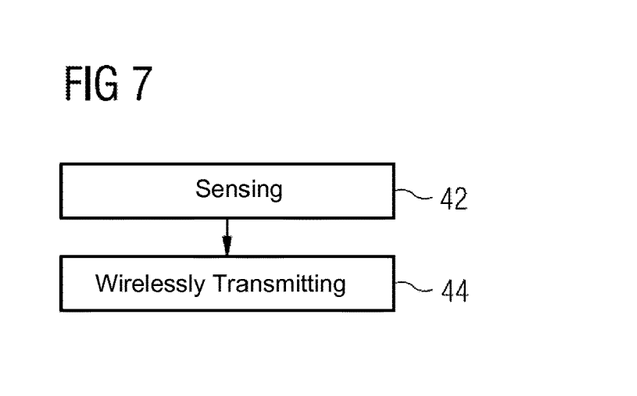
FIG. 7 shows a flow chart of an embodiment of a method for determining information related to a pressure of a tire.

FIG. 7 shows a flow chart of an embodiment of a method for obtaining information related to a pressure of a tire 30. The method comprises sensing 42 a signal indicating the information related to the deformations of the tire 30 and wirelessly transmitting 44 the information related to the deformation of the tire 30 from the tire 30 to a control device 40. In some embodiments the method may further comprise providing the signal indicating the information related to the deformation of the tire to a tire pressure sensor module before transmitting the information to the control device.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a determiner", "a controller", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A pressure sensitive foil locatable on an inside of a tire and configured to sense information related to a deformation of the tire defined by a contact area of the tire with a surface, the pressure sensitive foil comprising an interface configured to provide a signal indicating the information related to the deformation of the tire to a controller, wherein the information includes a pressure distribution indicating a shape of the contact area of the tire with the surface, and the shape is related to a type of motion of the tire.

2. The pressure sensitive foil of claim 1, wherein the interface is configured to provide the signal indicating the information related to the deformation of the tire to the controller via a tire pressure sensor module.

3. The pressure sensitive foil of claim 2, wherein the interface is configured to establish a wired connection to the tire pressure sensor module.

4. The pressure sensitive foil of claim 1, wherein the interface is further configured to power supply the pressure sensitive foil.

5. The pressure sensitive foil of claim 1 being coupled to the controller, which is configured to provide a signal to the pressure sensitive foil based on which the information related to the deformation of the tire is sensed.

6. The pressure sensitive foil of claim 5, wherein the controller is configured to carry out tire deformation measurements using the pressure sensitive foil as deformation sensor.

7. The pressure sensitive foil of claim 1, wherein the shape is rectangular, indicating that the tire is at a standstill.

8. The pressure sensitive foil of claim 1, wherein the shape is larger at an outside edge than at an inside edge, indicating that the tire is in a cornering scenario.

9. The pressure sensitive foil of claim 1, wherein the shape is asymmetrical to the center of the tire, indicating that the tire is in an aquaplaning scenario.

10. A tire pressure sensor module locatable on an inside of a tire and configured to provide to a controller information related to a deformation of the tire defined by a contact area of the tire with a surface, the tire pressure sensor module comprising an interface configured to obtain a signal indicating the information related to the deformation of the tire from a pressure sensitive foil, wherein the information includes a pressure distribution indicating a shape of the contact area of the tire with the surface, and the shape is related to a type of motion of the tire.

11. The tire pressure sensor module of claim 10, wherein the interface is configured to establish a wired connection to the pressure sensitive foil.

12. The tire pressure sensor module of claim 10, comprising a transmitter configured to wirelessly transmit the information related to the deformation of the tire to the controller.

13. The tire pressure sensor module of claim 10, wherein the interface is further configured to power supply the pressure sensitive foil.

14. The tire pressure sensor module of claim 13, further comprising an energy harvester configured to generate the power to supply the pressure sensitive foil.

15. The tire pressure sensor module of claim 10, further comprising the controller, which is configured to provide signals to the pressure sensitive foil using the interface based on which the information related to the deformation of the tire is sensed.

16. The tire pressure sensor module of claim 15, wherein the controller is configured to carry out tire deformation measurements using the pressure sensitive foil as deformation sensor.

17. A tire comprising a pressure sensitive foil located on an inside of the tire and configured to sense information related to a deformation of the tire defined by a contact area of the tire with a surface, the pressure sensitive foil comprising an interface configured to provide a signal indicating the information related to the deformation of the tire to a controller, wherein the information includes a pressure distribution indicating a shape of the contact area of the tire with the surface, and the shape is related to a type of motion of the tire.

18. The tire of claim 17, further comprising a tire pressure sensor module coupled to the pressure sensitive foil and comprising a second interface configured to obtain the signal from the interface of the pressure sensitive foil.

19. The tire of claim 17, wherein the pressure sensitive foil extends at least partly along an inside of the tire on the backside of a contact area of the tire.

20. The tire of claim 17, wherein the pressure sensitive foil extents along an inside of a tire and along a complete circumferential backside of a contact area of the tire.

21. A tire for a vehicle comprising a pressure sensitive foil locatable on an inside of the tire and configured to sense information related to a deformation of the tire defined by a contact area of the tire with a surface, comprising a first interface configured to provide a signal indicating the information related to the deformation of the tire to a tire pressure sensor module, the tire pressure sensor module comprising a second interface, which is coupled with the first interface to obtain the signal indicating the information related to the deformation of the tire from the pressure sensitive foil, wherein the tire pressure sensor module further comprises a transmitter configured to wirelessly transmit the information related to the deformation of the tire to a controller, wherein the information includes a pressure distribution indicating a shape of the contact area of the tire with the surface, and the shape is related to a type of motion of the tire.

22. A method for obtaining information related to a deformation of a tire defined by contact area of the tire with a surface, comprising:
    sensing a signal indicating information related to the deformation of the tire defined by the contact area of the tire with the surface; and
    wirelessly transmitting the information related to the deformation of the tire from the tire to a controller,
    wherein the information includes a pressure distribution indicating a shape of the contact area of the tire with the surface, and the shape is related to a type of motion of the tire.

23. The method of claim 22, further comprising providing the signal indicating the information related to the deformation of the tire to a tire pressure sensor module before transmitting the information to the controller.

* * * * *